(12) United States Patent
Andeer et al.

(10) Patent No.: US 12,543,662 B2
(45) Date of Patent: Feb. 10, 2026

(54) APPARATUS FOR PLANT GROWTH EXPERIMENTS

(71) Applicant: The Regents of the University of California, Oakland, CA (US)

(72) Inventors: Peter Andeer, Oakland, CA (US); Lloyd Cornmesser, Ione, CA (US); Thomas Vess, San Ramon, CA (US); Trent Northen, Walnut Creek, CA (US)

(73) Assignee: THE REGENTS OF TH E UNIVERSITY OF CALIFORNIA, Oakland, CA (US)

( * ) Notice: Subject to any disclaimer, the term of this patent is extended or adjusted under 35 U.S.C. 154(b) by 339 days.

(21) Appl. No.: 18/175,182

(22) Filed: Feb. 27, 2023

(65) Prior Publication Data

US 2023/0354756 A1 Nov. 9, 2023

Related U.S. Application Data

(60) Provisional application No. 63/315,171, filed on Mar. 1, 2022.

(51) Int. Cl.
*A01G 9/24* (2006.01)

(52) U.S. Cl.
CPC .............. *A01G 9/249* (2019.05); *A01G 9/245* (2013.01)

(58) Field of Classification Search
CPC ...... A01G 31/022; A01G 31/02; A01G 9/245; A01G 9/249; A01G 9/143
See application file for complete search history.

(56) References Cited

U.S. PATENT DOCUMENTS

| | | | |
|---|---|---|---|
| 8,181,387 B2 | 5/2012 | Loebl et al. | |
| 8,931,208 B2 * | 1/2015 | Swanda | A01H 4/005 47/57.6 |
| 10,787,639 B2 | 9/2020 | Gao et al. | |

(Continued)

FOREIGN PATENT DOCUMENTS

JP 2021517467 A * 7/2021 ........... A01G 31/042

OTHER PUBLICATIONS

Greenhill et al., "Bayesian optimization for adaptive experimental design: A review", IEEE Access, vol. 8, pp. 13937-48, (2020).

(Continued)

*Primary Examiner* — Monica L Perry

(57) ABSTRACT

This disclosure provides systems, methods, and apparatus related to growing plants. In one aspect, an apparatus include a platform, a light emitting diode (LED) panel, one or more imaging modules, a liquid handling unit, a robotic arm, with these components being positioned in a chamber. A first surface of the platform including features defining a plurality of areas, with each area defining a space for a plant growth device. The LED panel is positioned to illuminate the first surface of the platform. The heat exchanger is in thermal contact with a second surface of the platform. The imaging module includes an imaging device from the group a microscope, a camera, and a scanner. The liquid handling unit is operable to add and remove liquids from the plant growth device. The robotic arm is operable to pick up and move the plant growth device from the platform to an imaging module.

17 Claims, 13 Drawing Sheets

(56) References Cited

U.S. PATENT DOCUMENTS

| | | | | |
|---|---|---|---|---|
| 11,510,376 | B2* | 11/2022 | Andeer | A01G 22/25 |
| 2008/0141585 | A1* | 6/2008 | Benfey | A01G 9/02 |
| | | | | 47/32.7 |
| 2018/0295783 | A1* | 10/2018 | Alexander | G01N 33/0098 |
| 2019/0261566 | A1* | 8/2019 | Robertson | G06T 7/50 |
| 2022/0007589 | A1* | 1/2022 | Binney | B25J 9/1679 |
| 2022/0234078 | A1* | 7/2022 | Bartrom | B07C 5/342 |
| 2025/0008883 | A1* | 1/2025 | Robertson | G06T 7/90 |

OTHER PUBLICATIONS

Rincent et al., "Optimization of multi-environment trials for genomic selection based on crop models", .Theor Appl Genet., vol. 130, No. 8, pp. 1735-1752, (Aug. 2017).

Tanaka et al., "Bayesian optimization for genomic selection: a method for discovering the best genotype among a large number of candidates", Theor. Appl. Genet., vol. 131, No. 1, pp. 93-105, (Jan. 2018).

Shahriari et al., "Taking the human out of the loop: A review of bayesian optimization", Proc. IEEE., vol. 104, No. 1, pp. 148-175, (Jan. 2016).

Szymanski et al., "An autonomous laboratory for the accelerated synthesis of novel materials", Nature, vol. 624, pp. 86-91, (Dec. 7, 2023).

Rapp et al., "Self-driving laboratories to autonomously navigate the protein fitness landscape", Nat. Chem. Eng., vol. 1, pp. 97-107, (Jan. 2024).

Melton et al., "K-means-driven Gaussian Process data collection for angle-resolved photoemission spectroscopy", Mach. Learn. Sci. Technol., vol. 1, pp. 045015, (Dec. 2020).

Noack et al., "Advances in Kriging-Based Autonomous X-Ray Scattering Experiments", Sci. Rep., vol. 10, (Jan. 28, 2020).

Noack et al., MM, Yager KG, Fukuto M, Doerk GS, Li R, Sethian Ja. A Kriging-Based Approach to Autonomous Experimentation with Applications to X-Ray Scattering. Sci Rep., vol. 9, pp. 11809 (1-9), (Aug. 14, 2019).

Crossa et al., "Expanding genomic prediction in plant breeding: harnessing big data, machine learning, and advanced software", Trends in Plant Sci., vol. 30, No. 7, pp. 756-774, (Jul. 2025).

Nikitin et al., Bayesian optimization for seed germination. Plant Methods, vol. 15, pp. 1-10, (2019).

Khan et al., "Bayesian optimized multimodal deep hybrid learning approach for tomato leaf disease classification", Scientific Reports, vol. 14, pp. 21525 (1-30), (Sep. 2024).

Nagel et al., "GROWSCREEN-Rhizo is a novel phenotyping robot enabling simultaneous measurements of root and shoot growth for plants grown in soil-filled rhizotrons", Functional Plant Biol. vol. 39, pp. 891-904, (2012).

Li et al., "High-Throughput Plant Phenotyping Platform (HT3P) as a Novel Tool for Estimating Agronomic Traits From the Lab to the Field", Front Bioeng Biotechnol., vol. 8, pp. 623705, (2020).

Virlet et al., "An automated robotic field phenotyping platform for detailed crop monitoring", Funct. Plant Biol., vol. 44, No. 1, pp. 143-153, (Feb. 2016).

Fahlgren et al., "A versatile phenotyping system and analytics platform reveals diverse temporal responses to water availability in setaria", Mol. Plant., vol. 8, No. 10, pp. 1520-1535, (Oct. 5, 2015).

Wu et al., "RhizoChamber-Monitor: a robotic platform and software enabling characterization of root growth", Plant Methods, vol. 14, pp. 44 (1-15), (Jun. 7, 2018).

Hüther et al., "K, Bezrukov I, Becker C. Aradeepopsis, an Automated Workflow for Top-View Plant Phenomics using Semantic Segmentation of Leaf States", The Plant Cell, vol. 32, pp. 3674-3688, (Dec. 2020).

* cited by examiner

APPARATUS FOR PLANT GROWTH EXPERIMENTS

RELATED APPLICATIONS

This application claims priority to U.S. Provisional Patent Application No. 63/315,171, filed Mar. 1, 2022, which is herein incorporated by reference.

This application is related to U.S. Pat. No. 10,787,639, issued Sep. 29, 2020 and to U.S. Pat. No. 11,510,376, issued Nov. 29, 2022, both of which are herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

BACKGROUND

Effectively harnessing beneficial microbes for agriculture has become an important approach to sustainable agriculture and soil carbon management. Unfortunately, existing 'biological' treatments have struggled to achieve predictable and reproducible performance. This has widely been attributed to a lack of mechanistic understanding of the environmental, biological, and ecological factors that impact performance.

SUMMARY

Experimental systems that enable experimentation under sterile conditions are needed to provide the missing information on the key determinants of the performance of 'biological' treatments as well as to support their discovery and optimization. Described herein is an apparatus that enables discovering, characterizing, and optimizing beneficial microbial treatments. This apparatus is equally useful in discovering, characterizing, and optimizing plant genotypes as well as chemical and environmental treatments and combinations of these. By automating operation of the apparatus, the apparatus can be used rapidly characterize treatments under sterile conditions that improve plant or algal growth under sterile conditions (where sterile denotes the experimental control over the microbial composition). Further, using automated manipulation of liquids, movement and sampling of sterile plant growth devices, and data collection and analysis can enable autonomous experimentation.

One innovative aspect of the subject matter described in this disclosure can be implemented in an apparatus including a platform, a light emitting diode (LED) panel, one or more imaging modules, a liquid handling unit, a robotic arm, and a chamber. The platform, the LED panel, the heat exchanger, the one or more imaging modules, the liquid handling unit, and the robotic arm are positioned within the chamber. The chamber is a chamber with a controlled environment. A first surface of the platform including features defining a plurality of areas, with each area defining a space for a plant growth device. The LED panel is positioned to illuminate the first surface of the platform. The heat exchanger is in thermal contact with a second surface of the platform. The imaging module includes an imaging device from the group a microscope, a camera, and a scanner. The liquid handling unit is operable to add and remove liquids from the plant growth device. The robotic arm is operable to pick up and move the plant growth device from the platform to an imaging module.

In some embodiments, the platform comprises a metal. In some embodiments, the platform defines about 16 to 50 areas. In some embodiments, an area of the plurality of areas is about 85 millimeters by 127 millimeters. In some embodiments, areas of the plurality of areas on the platform are defined in a shape of a square or a rectangle.

In some embodiments, the heat exchanger uses a liquid to heat and cool the platform.

In some embodiments, a surface defined by light emitting diodes of the LED panel is substantially parallel to the platform. In some embodiments, the LED panel includes a first LED that emits light at 385 nanometers, a second LED that emits light at 450 nanometers, a third LED that emits light at 521 nanometers, a fourth LED that emits light at 660 nanometers, a fifth LED that emits light at 730 nanometers, and a sixth LED that emits light at 2700 K. In some embodiments, an intensity of light emitted by the LED panel is about 80 $\mu mol \cdot m^{-2} \cdot s^{-1}$ to 600 $\mu mol \cdot m^{-2} \cdot s^{-1}$.

In some embodiments, the microscope is operable to perform Fourier transform-infrared (FT-IR) imaging, short-wave infrared (SWIR) imaging, or Raman imaging. In some embodiments, the camera is a visible range hyperspectral camera. In some embodiments, the imaging module including a camera further includes a rotatable platform on which the plant growth device is placed.

In some embodiments, the liquid handling unit includes one or more pipettes operable to add and remove liquids from the plant growth device.

In some embodiments, humidity, oxygen level, and carbon dioxide level are substantially maintained at specified values in the chamber.

In some embodiments, the apparatus further includes a tilt module, with the tilt module being operable to tilt a base the plant growth device about 25° to 45° from the horizontal. In some embodiments, the apparatus further includes a fan operable to circulate air within the chamber.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Described herein is a growth apparatus (also referred to as an EcoBOT or an EcoBOT apparatus) that can be used to control the environmental conditions (e.g., temperature, light, water, and chemical) for plants or algae growing in plant growth devices. Embodiments of such plant growth devices include the plant growth devices described in U.S. Pat. Nos. 10,787,639 and 11,510,376, which are referred to as EcoFABs, EcoFAB devices, or EcoFAB units therein. In some embodiments, a plant growth device is designed for the growth of a single plant. In some embodiments, the growth chamber and the root chamber of a plant growth device are a sterile environment for the growth of a plant.

The features of the plant growth device described in U.S. Pat. No. 11,510,376 are set forth below. Further details regarding a plant growth device can be found in U.S. Pat. Nos. 10,787,639 and 11,510,376.

Figure 1:
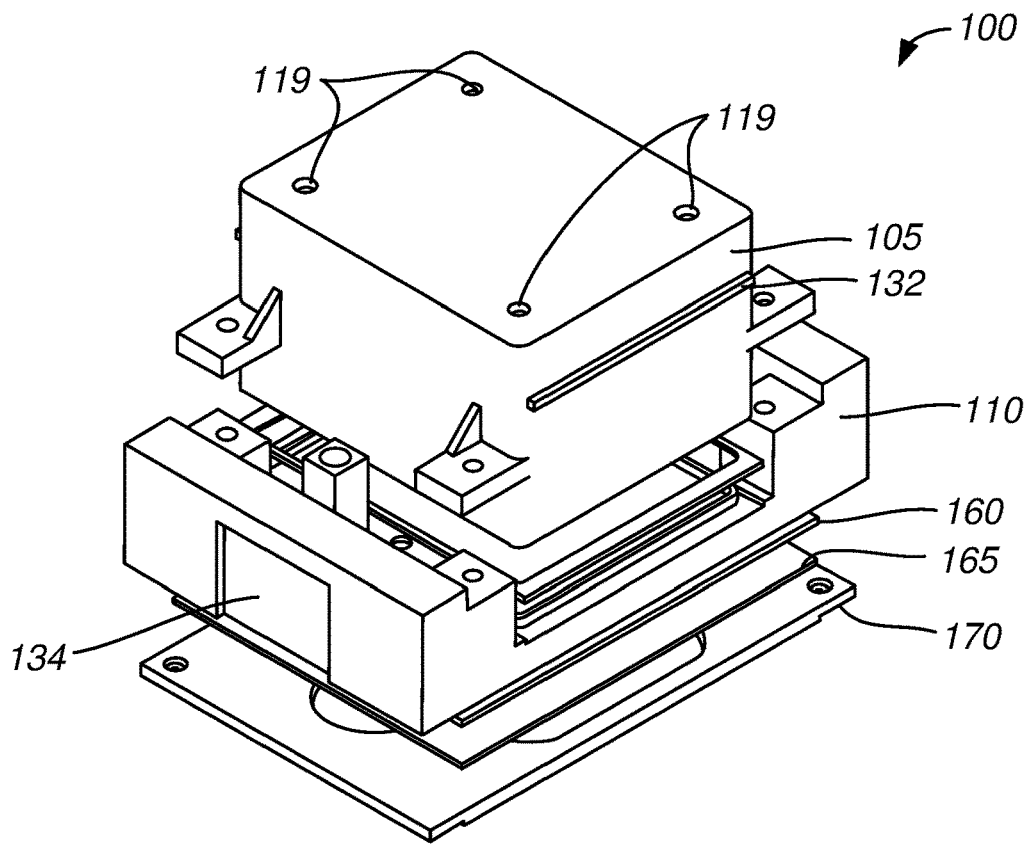
FIGS. 1 and 2 show examples of schematic illustrations of a plant growth device.
Figure 2:
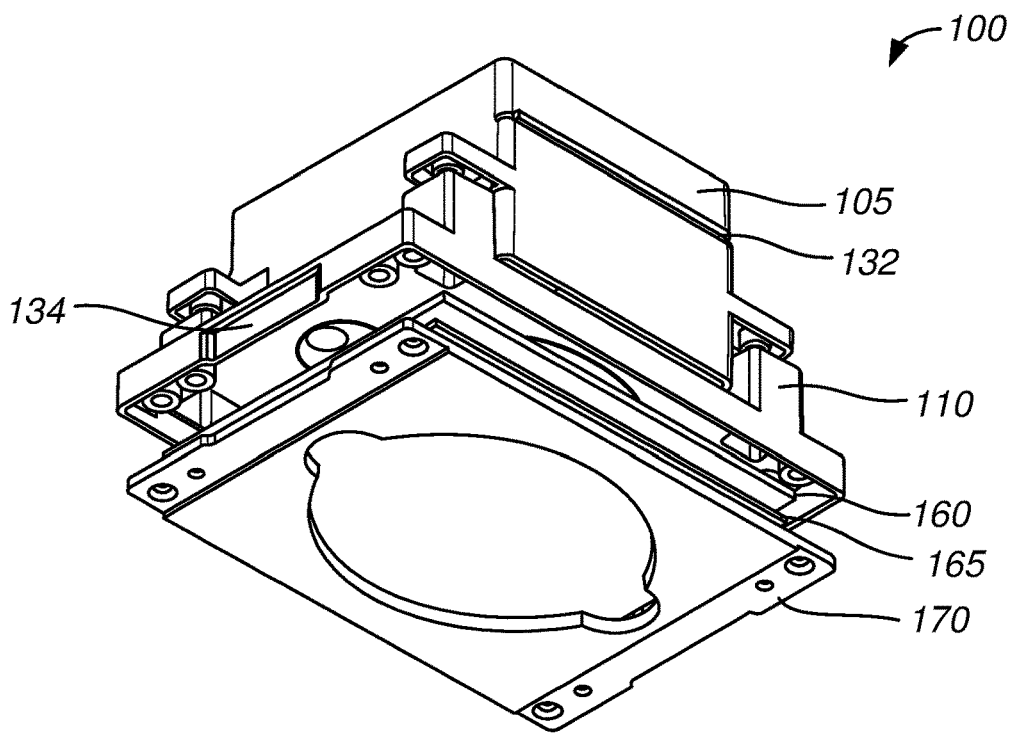
Figure 3:
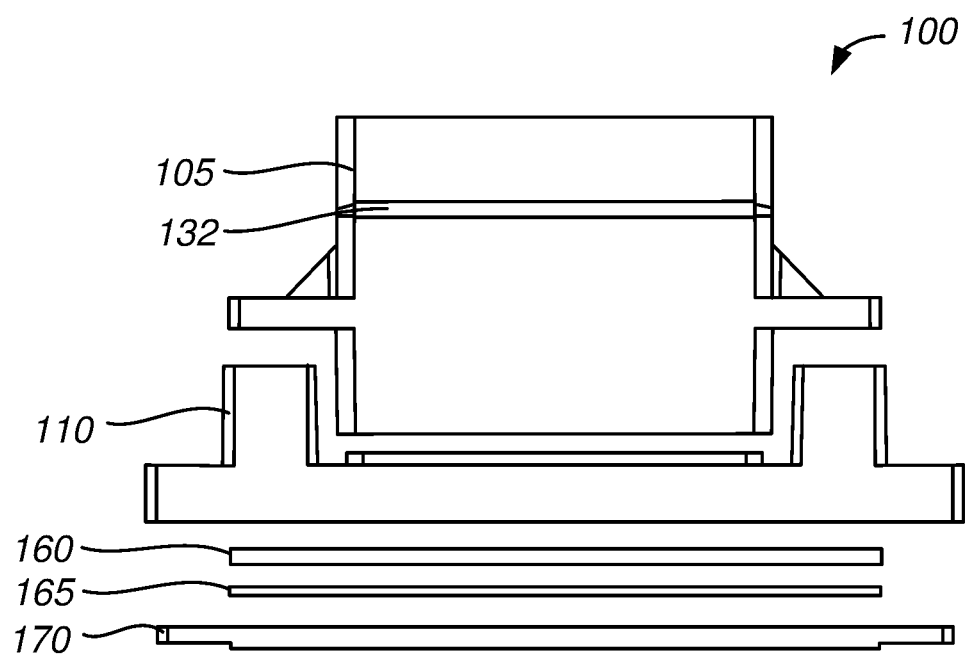
FIGS. 3 and 4 show examples of schematic illustrations of a side view and an end-view of a plant growth device.
Figure 4:
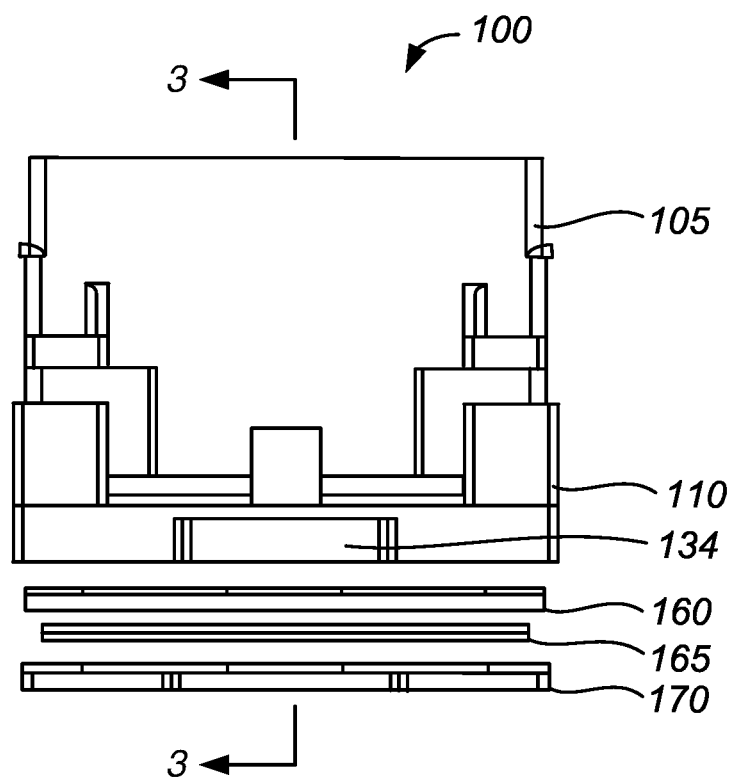
Figure 5:
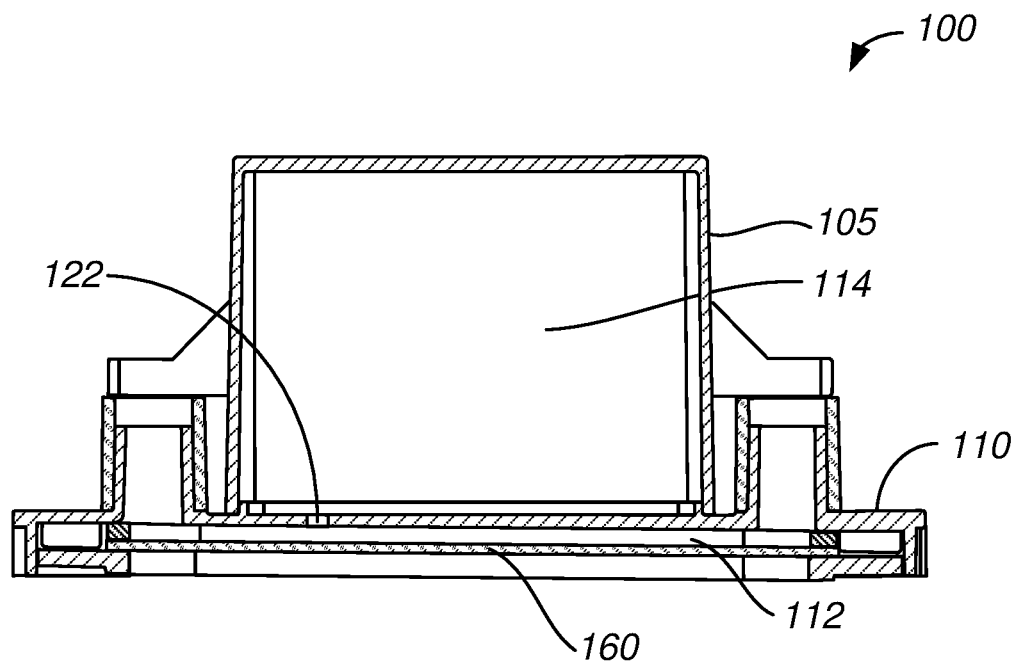
FIGS. 5 and 6 show examples of cross-sectional schematic illustrations of a plant growth device.
Figure 6:
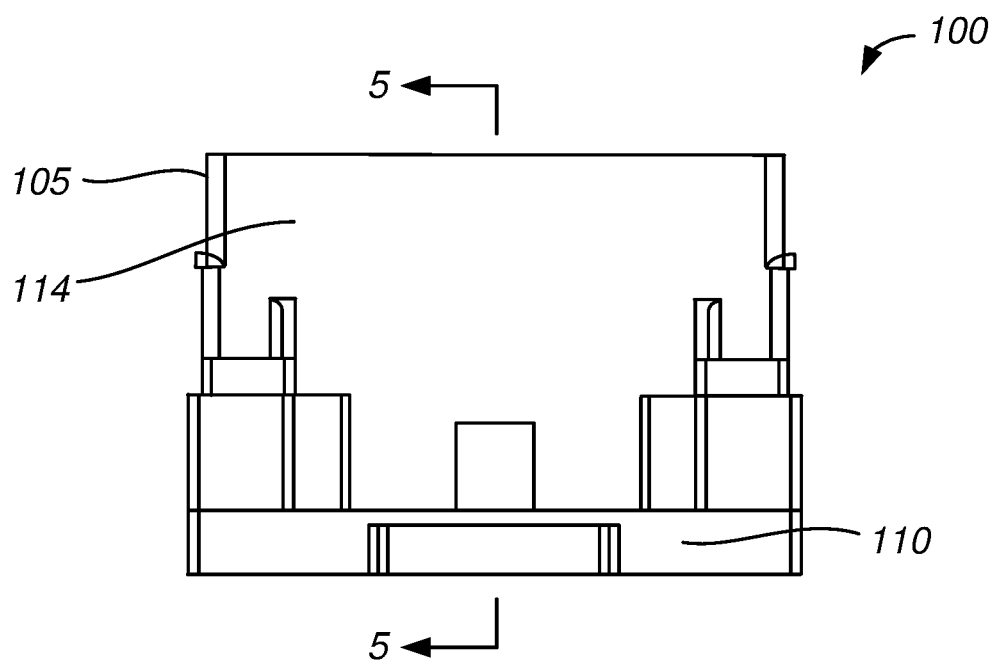
Figure 7:
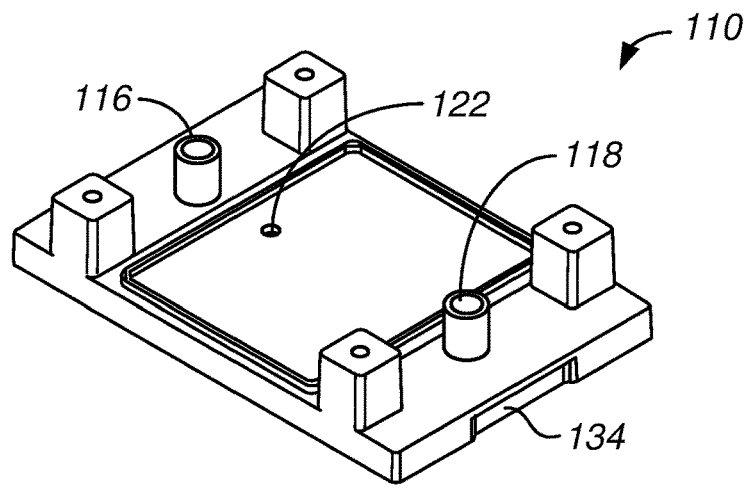
FIGS. 7-9 show examples of schematic illustrations of a base of a plant growth device.
Figure 8:
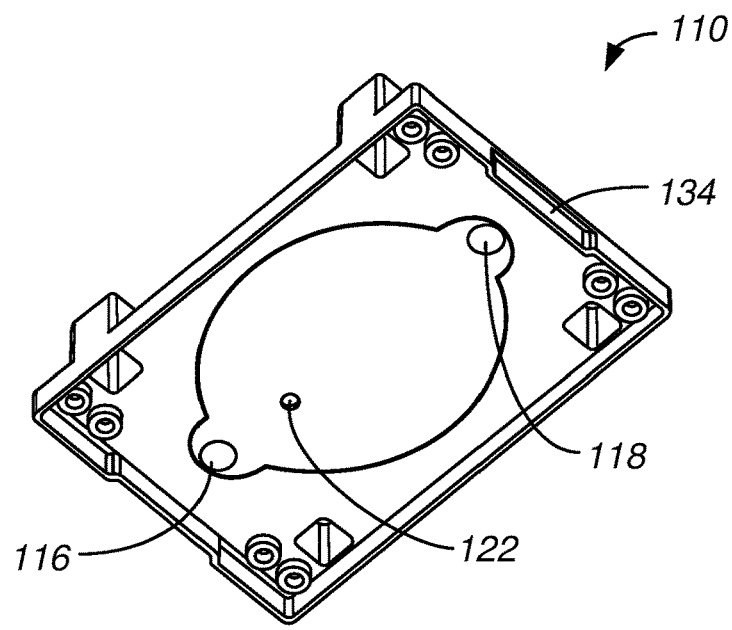
Figure 9:
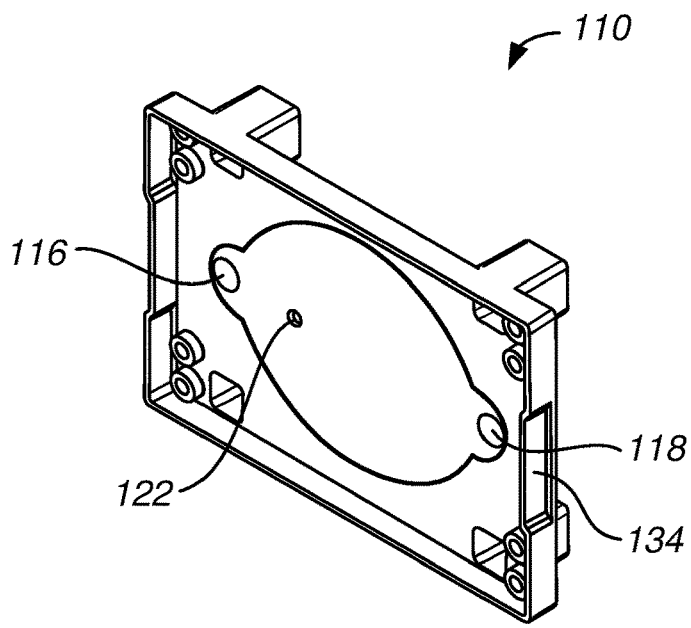
Figure 10:
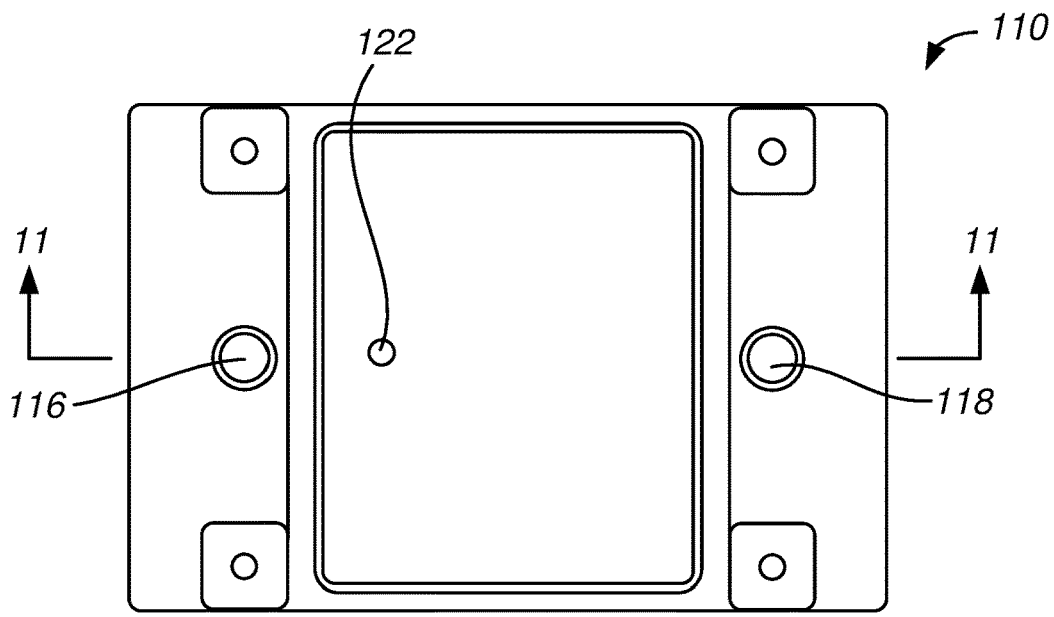
FIG. 10 shows an example of a schematic illustration of a top-view of a base of a plant growth device.
Figure 11:
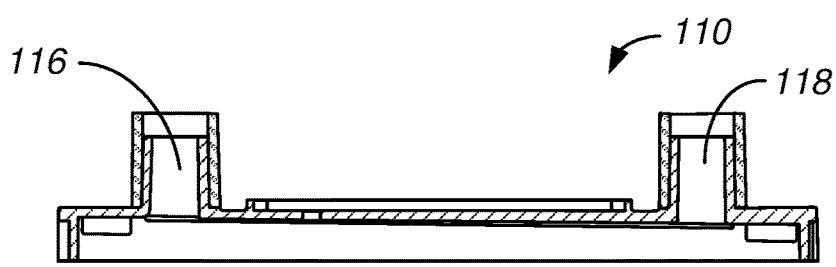
FIG. 11 shows an example of a cross-sectional schematic illustration of a side-view of a base of a plant growth device.
Figure 12:
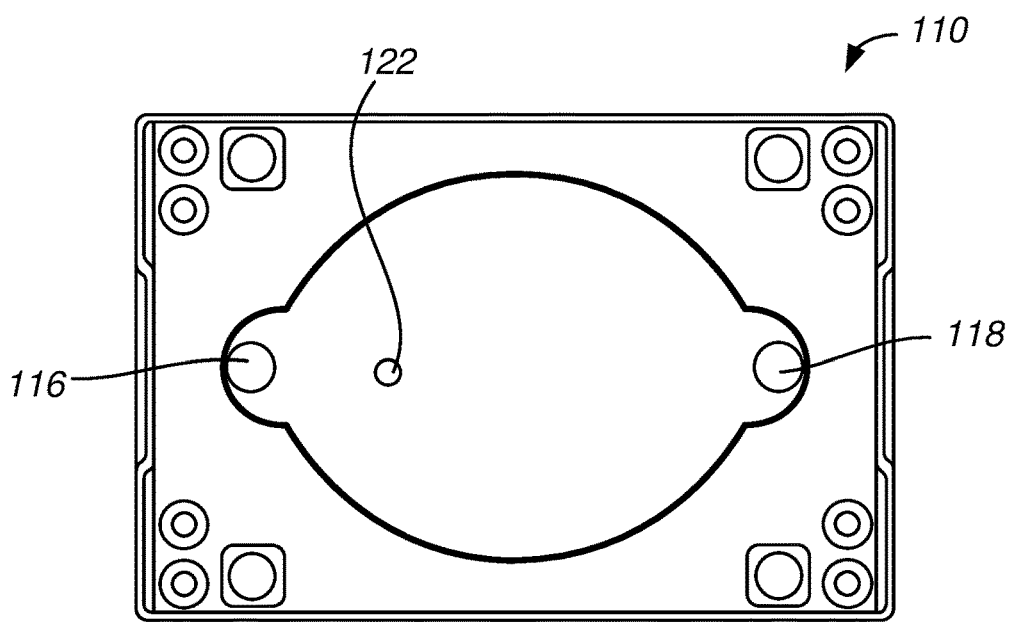
FIG. 12 shows an example of a schematic illustration of a bottom-view of a base of a plant growth device.

FIGS. 1 and 2 show examples of schematic illustrations of a plant growth device. FIGS. 3 and 4 show examples of schematic illustrations of a side view and an end-view of a plant growth device. FIGS. 5 and 6 show examples of cross-sectional schematic illustrations of a plant growth device. FIGS. 7-9 show examples of schematic illustrations of a base of a plant growth device. FIG. 10 shows an example of a schematic illustration of a top-view of a base of a plant growth device. FIG. 11 shows an example of a cross-sectional schematic illustration of a side-view of a base of a plant growth device. FIG. 12 shows an example of a schematic illustration of a bottom-view of a base of a plant growth device.

As shown in FIG. 1-12, a plant growth device 100 includes an enclosure 105, a base 110, and a substrate 165. In some embodiments, the device 100 includes a gasket 160 and a backing plate 170.

The substrate 165 is in contact with a first surface of the base 110. The substrate 165 and the base 110 define a root chamber 112. The enclosure 105 is in contract with a second surface of the base 110. The base 110 and the enclosure 105 define a growth chamber 114. The base 110 defines a stem port 122 that connects the root chamber 112 and the growth chamber 114. In some embodiments, a ridge on the second side of the base 110 helps to ensure that the enclosure 105 sits tightly on the base 110 to avoid contaminants entering into the growth chamber 112.

In some embodiments, a gasket (not shown) is disposed between the enclosure 105 and the base 110. In some embodiments, the gasket is an O-ring. In some embodiments, a grove (not shown) is defined in the base 110 such that the gasket fits within the grove. Such a gasket would help in sealing the growth chamber 114 for creating a controlled atmosphere. In some embodiments, ports 119 are defined in the enclosure 105. Ports 119 could allow for air exchange or could be connected to tubing or other gas flow system to create a controlled atmosphere.

The base 110 further defines a first port 116 and a second port 118. The first port 116 and the second port 118 are both in fluid communication with the root chamber 112. In some embodiments, the first port 116 is outside of the growth chamber 114. In some embodiments, the second port 118 is outside of the growth chamber 114. In some embodiments, the first port 116 and the second port 118 are able to accept or interface with a pipette. The first port 116 and the second port 118 may have covers or caps placed on them when not in use. These features can make the device 100 compatible with automated platforms (e.g., robotic sampling in a growth apparatus). The first port 116 and the second port 118 located outside of the growth chamber 114 allows for manual or automated pipetting, as well as connection to pumps, without opening the device 100. This also minimizes the chances of contamination due to opening and closing the growth chamber 114.

The device 100 is operable to contain a plant. Roots of the plant are in the root chamber 112. A stem of the plant passes through the stem port 122. Leaves of the plant are in the growth chamber 114. In some embodiments, a volume of the root chamber 112 is about 4 milliliters (mL) to 20 mL, about 1 mL to 5 mL, or about 4 mL to 5 mL. In some embodiments, a diameter of the stem port 122 is about 1 millimeter (mm)

to 5 mm, or about 3 mm. In some embodiments, a volume of the growth chamber 114 is about 250 milliliters (mL) to 1000 mL. This corresponds to a height of the growth chamber of about 50 mm (for a 250 mL growth chamber) to 200 mm (for a 1000 mL growth chamber).

The backing plate 170 is affixed to the base 110. The backing plate 170 serves to hold the substrate 165 in contact with the first surface of the base 110.

In some embodiments, the device 100 includes features that make it better able to operate under aseptic conditions. For example, the root chamber 112 is set on the underside of the growth chamber 114 for the device 100. This largely seals the root chamber 112 off from the growth chamber 114. In some embodiments, the gasket 160 is disposed between the substrate 165 and the base 110. The gasket 160 aids in forming a seal between the substrate 165 and the base 110 that is not permeable to a liquid. The gasket 160 can seal the root chamber 112 from the outside environment. In some embodiments, the gasket 160 comprises a polymer.

In some embodiments, the base 110 and the enclosure 105 each comprise a polymer. In some embodiments, the base 110 and the enclosure 105 each comprise a material selected from a group consisting of polycarbonate, polypropylene, polyethylene, and cyclic olefin copolymer. In some embodiments, the base 110 and the enclosure 105 can be fabricated using injection molding. In some embodiments, the base 110 and the substrate 165 are a single piece of material. For example, in some embodiments, the base 110 and the substrate 165 are fabricated (e.g., injection molded) as a single piece using a polymer.

In some embodiments, the enclosure 105 is transparent to visible light and to infrared light. In some embodiments, the base 110 is transparent to visible light and to infrared light. In some embodiments, the base 110 is transparent to infrared light and blocks at least a portion of light in the visible spectrum. Such a base 110 (i.e., a base blocking at least a portion of light or all of the light in the visible spectrum) can more closely replicate the conditions of a plant growing in soil.

In some embodiments, the substrate 160 comprises a sheet of glass (e.g., a borosilicate glass). In some embodiments, the substrate 160 is transparent to visible light. The substrate 160 being optically transparent allows for imaging and microcopy of roots in the root chamber 112.

In some embodiments, the backing plate 170 comprises a polymer. In some embodiments, the backing plate 170 comprises a material selected from a group consisting of polycarbonate, polypropylene, polyethylene, and cyclic olefin copolymer. In some embodiments, the backing plate 170 can be fabricated using injection molding.

For plant growth studies and automated sampling, it may be important to have gravity flow of a liquid from an inlet port (e.g., the first port 116) to outlet port (e.g., the second port 118) of the device 100. However, most automated systems require a device to sit flat and the ports to be accessed vertically. To address this issue, in some embodiments, the first surface of the base 110 is sloped (e.g., at about 0.5° to 30°, or greater than about 30°). The exterior of the base 100 is flat. The substrate 165 in contact with the first surface of the base 110 would then be sloped. Such a sloped substrate 165 creates gravitropism in the root chamber 112 to guide root growth of the plant.

So that the substrate 165 of the device 100 is sloped, in some embodiments, the first surface of the base 110 has a smaller thickness proximate or at the first port 116 compared to the second port 118, imparting a downward slope of the substrate 165 from level from the first port 116 to the second port 118 when the device 100 is sitting on a level surface. This difference in thickness of the first surface of the base 110 can be seen in FIG. 11. In some embodiments, the substrate 165 has a downward slope of about 0.5 to 30 degrees from level from the first port 116 to the second port 118. This slope of the substrate 165 allows for flow of a liquid from the first port 116 to the second port 118 while the device 100 is sitting on a level surface.

Many devices used in high-throughput micro- and molecular-biology (e.g., microwell plates) conform to standard footprint established by the Society for Biomolecular Screening (SBS), which has dimensions of 85.48 mm by 127.76 mm. In some embodiments, the base 110 of the device 100 has dimensions that conform to the SBS standard; i.e., in some embodiments, the base 110 of the device 100 is about 85.48 mm by 127.76 mm.

A device 100 may include features that make it compatible with automated platforms (e.g., a growth apparatus). In some embodiments, features are defined on the base 110 and the enclosure 105. The features serve to aid a robotic arm in gripping and manipulating the device 100. For example, in some embodiments, ridges 132 are defined on the enclosure 105. In some embodiments, the enclosure only includes one set of ridges to allow for injection molding without undercuts. As another example, in some embodiments, indentations 134 are defined in the base 110. Such features can allow a robotic device to grip the device 100 at multiple locations. These features can allow the device 100 to be situated in multiple positions, as well as allowing for a robotic device to reach over other devices 100 and grip one device 100 from behind.

A growth apparatus operable to contain plant growth devices having plants or algae growing therein is described below. The plant growth devices described with respect to the growth apparatus may include any of the embodiments of the plant growth devices described herein. FIGS. 13A-20 show examples illustrations of different configurations of and the various components of a growth apparatus.

Figure 13A:
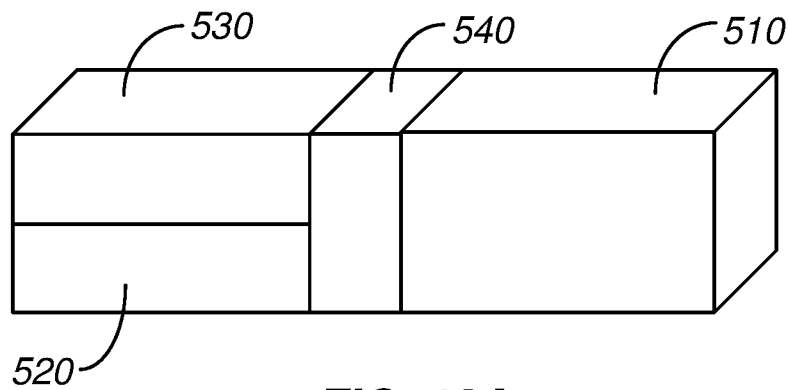
FIGS. 13A-13C show examples of illustrations of different configurations of a growth apparatus.
Figure 13B:
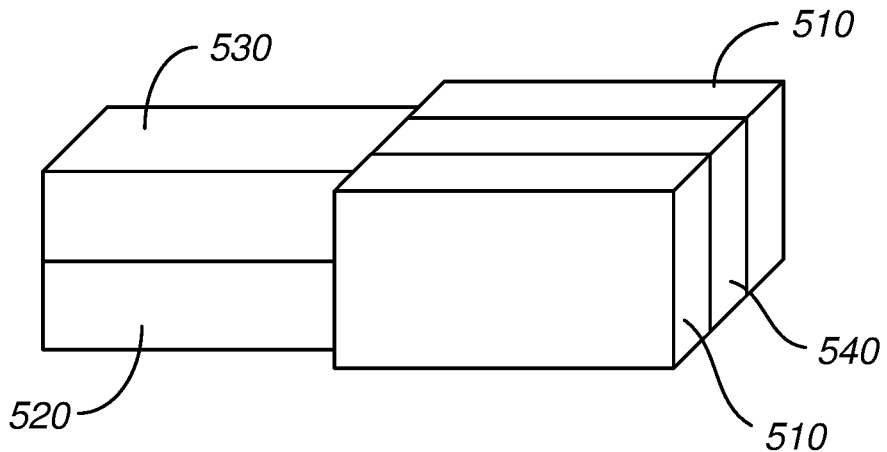
Figure 13C:
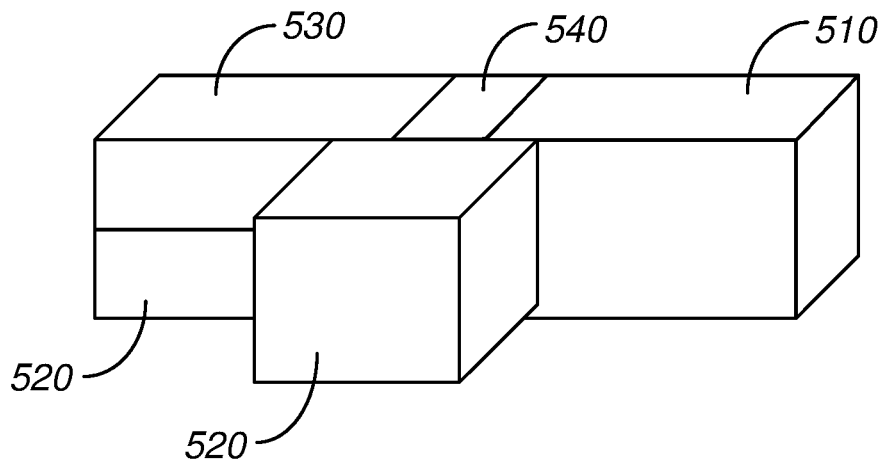
Figure 14:
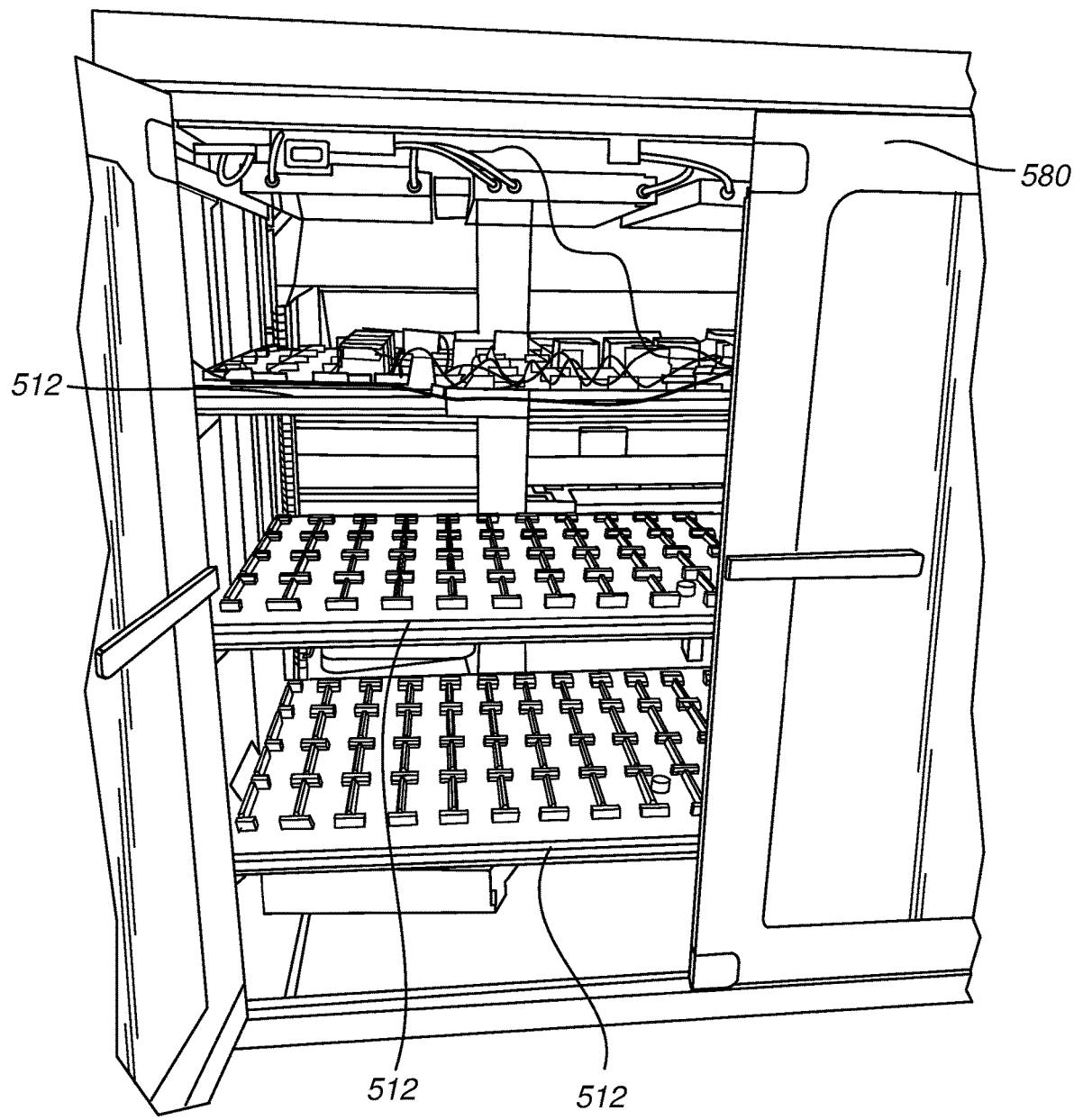
FIG. 14 shows an example of an illustration of a chamber and platforms disposed in the chamber of a growth apparatus.
Figure 15:
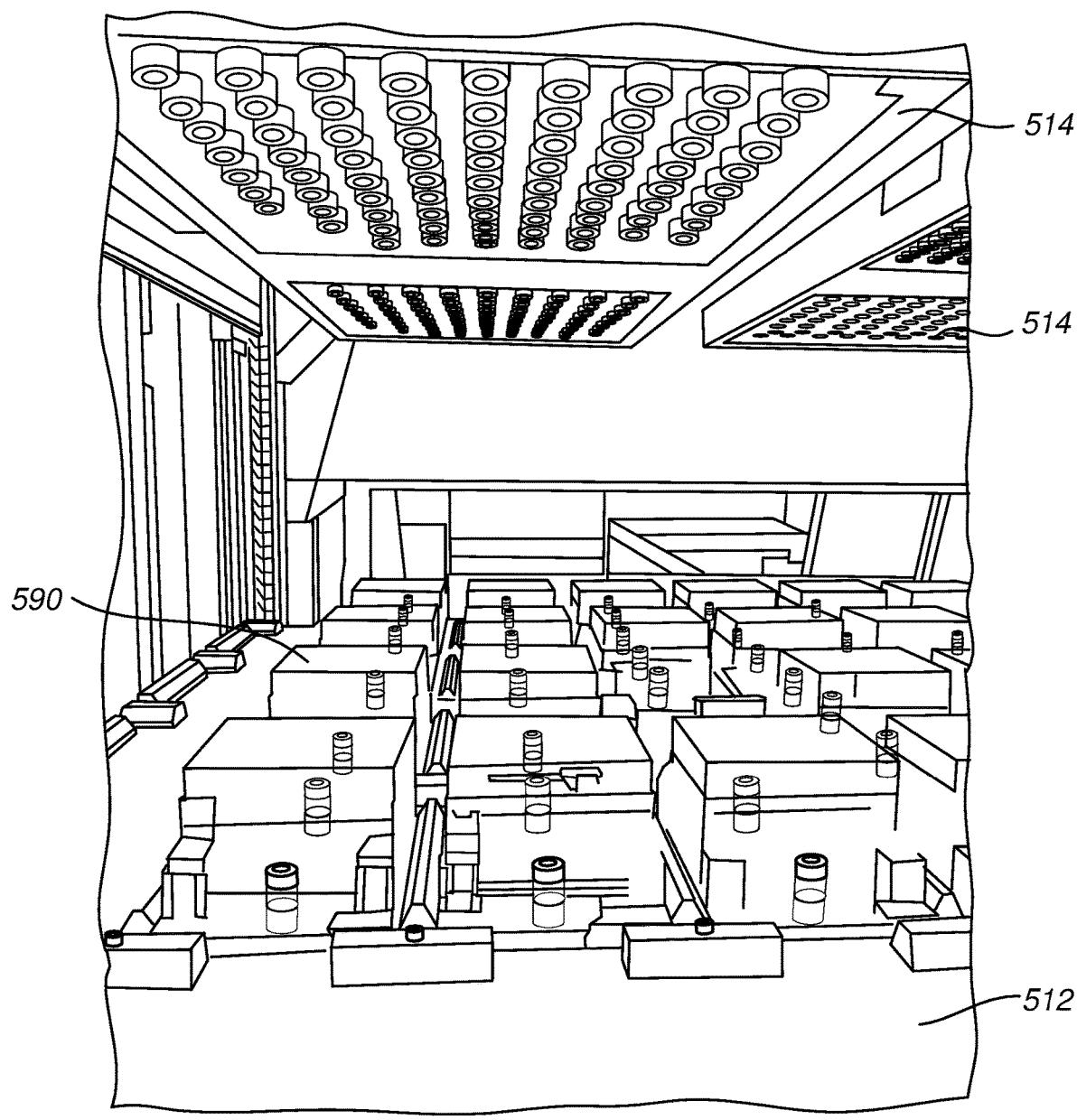
FIG. 15 shows and example of an illustration of a platform, LED panels, and plant growth devices disposed on the platform.
Figure 16:
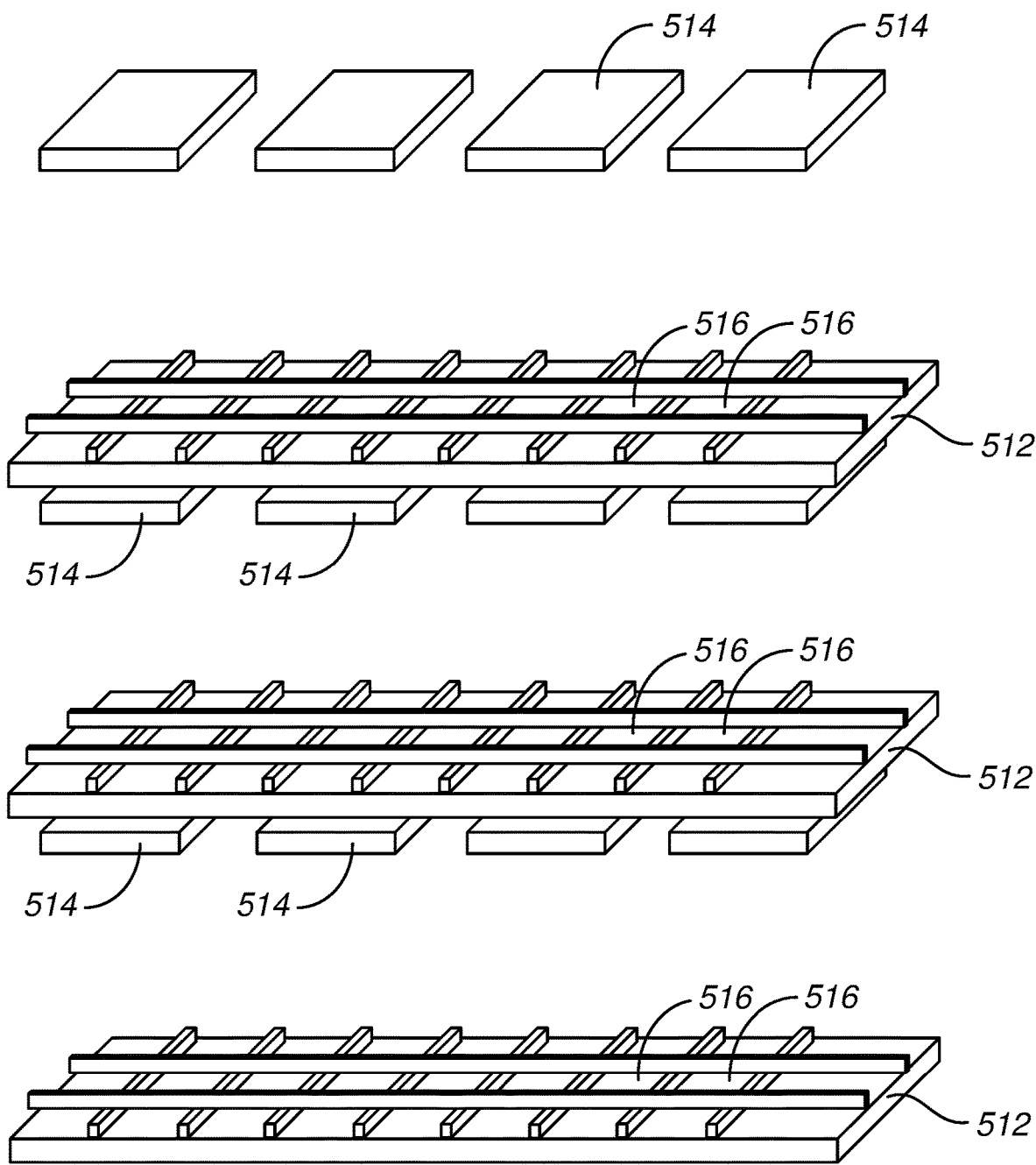
FIG. 16 shows an example of an illustration of three platforms, LED panels, and areas defined on the platforms.
Figure 17A:
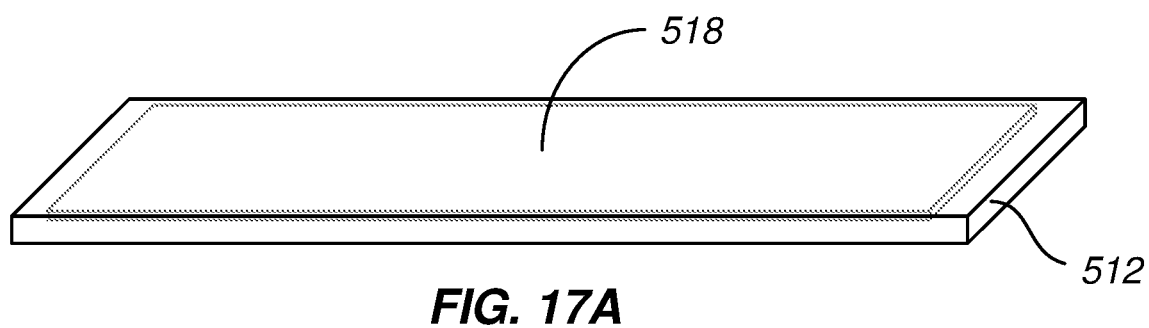
FIG. 17A shows an example of an illustration of a platform with a heat exchanger in thermal contact with a second side of the platform.
Figure 17B:
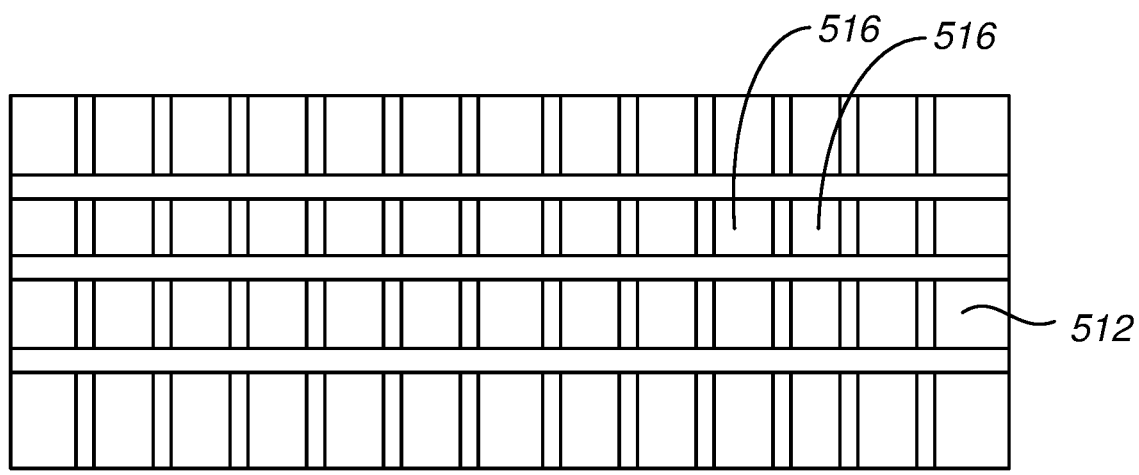
FIG. 17B shows an example of an illustration of a platform with areas defined on the first surface of the platform.

FIGS. 13A-13C show examples of illustrations of different configurations of a growth apparatus. FIG. 14 shows an example of an illustration of a chamber and platforms disposed in the chamber of a growth apparatus. FIG. 15 shows and example of an illustration of a platform, LED panels, and plant growth devices disposed on the platform. FIG. 16 shows an example of an illustration of three platforms, LED panels, and areas defined on the platforms. FIG. 17A shows an example of an illustration of a platform with a heat exchanger in thermal contact with a second side of the platform. FIG. 17B shows an example of an illustration of a platform with areas defined on the first surface of the platform.

A growth apparatus includes a platform 512, a light emitting diode (LED) panel 514, a heat exchanger 518, one or more imaging modules 520, a liquid handling unit 530, a robotic arm 540, and a chamber 580. A chamber in which the platform 512, the light emitting diode (LED) panel 514, and the heat exchanger 518 are disposed may be referred to as a light chamber 510 (see FIGS. 13A-13C). In some embodiments, a first surface of the platform includes features defining a plurality of areas 516. Each area defines a space for a plant growth device 590. In some embodiments, the LED panel 514 is positioned to illuminate the first surface of the platform 512 (and the plant growth devices 590 disposed thereon). In some embodiments, the heat exchanger 518 is in thermal contact with a second surface of the platform 512. In some embodiments, an imaging module 520 includes an imaging device from the group a microscope, a camera, and a scanner. In some embodiments, the liquid handling unit 530 is operable to add and remove liquids from a plant growth device 590. In some embodiments, the robotic arm 540 is operable to pick up and move a plant growth device 590 from the platform 512 to an imaging module 520. In some embodiments, the platform 512, the LED panel 514, the heat exchanger 518, the one or more imaging modules, the liquid handling unit 530, and the robotic arm 540 are positioned within the chamber 580. In some embodiments, an environment in the chamber 580 is controlled. The different components of a growth apparatus are described further below.

The platform 512 serves as a platform onto which plant growth devices 590 can be positioned. In some embodiments, the platform 512 is horizontal or substantially horizontal when the growth apparatus is in operation. In some embodiments, a platform 512 is about 1 meter (m) to 2 m by 1 m to 2 m. In some embodiments, a growth apparatus includes, one, two, three, four, or five platforms. When a growth apparatus includes two or more platforms, additional LED panels and heat exchangers associated with each platform are included in the growth apparatus.

In some embodiments, the areas 516 on the platform 512 for plant growth devices 590 are arranged in a grid pattern. The plant growth devices 590 being arranged on a platform 512 in a grid pattern can aid in monitoring the environmental conditions of each plant growth device 590. In some embodiments, rails (e.g., aluminum rails) define each area.

In some embodiments, the platform 512 defines about 16 to 50 areas 516. In some embodiments, the areas 516 on the platform 512 are defined in a shape of a square or a rectangle. In some embodiments, an area is about 85 millimeters (mm) by 128 mm, or about 85.48 mm by 127.76 mm. Many devices used in high-throughput micro- and molecular-biology (e.g., microwell plates) conform to standard footprint established by the Society for Biomolecular Screening (SBS), which has dimensions of 85.48 mm by 127.76 mm.

In some embodiments, the platform 512 comprises a metal. In some embodiments, the platform 512 comprises aluminum. In some embodiments, the platform 512 comprises black anodized aluminum. Black anodized aluminum helps to reduce reflections from the LED panel 514 and absorbs heat generated by the LED panel 514.

In some embodiments, a platform 512 is a single piece of metal. In some embodiments, a platform 512 comprises two or more pieces of metal. With a platform made up of two or more pieces of metal and thermal insulation between the edges of adjoining pieces of metal, the temperature of sections of a platform could be controlled with separate heat exchangers.

The LED panel 514 is operable to provide light that is needed for photosynthesis to plants contained in plant growth devices 590. In some embodiments, a surface defined by light emitting diodes of the LED panel 514 is substantially parallel to the platform 512. This helps to ensure that each plant growth device 590 is receiving the same amount of lighting from the LED panel 514.

In some embodiments, an LED panel 514 includes 6 or more different LEDs that emit light at different frequencies. For example, in some embodiments, the LED panel 514 includes a first LED that emits light at 385 nanometers, a second LED that emits light at 450 nanometers, a third LED that emits light at 521 nanometers, a fourth LED that emits light at 660 nanometers, a fifth LED that emits light at 730 nanometers, and a sixth LED that emits light at 2700 K (2700 K light is white light that is not at a single wavelength).

In some embodiments, the intensity of light emitted by an LED panel 514 is about 80 $\mu mol \cdot m^{-2} s^{-1}$ to 600 $\mu mol \cdot m^{-2} s^{-1}$. The $\mu mol \cdot m^{-2} s^{-1}$ is a manner in which photosynthetically active radiation (PAR) can be reported.

An LED panel 514 may not large enough to uniformly illuminate a platform 512. In such cases, in some embodiments, a plurality of LED panels are positioned to illuminate the first surface of the platform 512. In an instance where there are two or more LED panels illuminating the platform 512, different lighting regimes could be used for each LED panel.

In some embodiments, an LED panel 514 comprises calibrated LEDs operable to provide light treatments with varying spectra (i.e., wavelength and intensity) to the plant growth devices 590, including far-red end-of-day treatment, brief UV light, and night interruption light, for example.

In some embodiments, the growth apparatus includes spectrometers operable to measure the light spectra at specified positions in the growth apparatus. In some embodiments, a spectra at each area 516 is characterized so that differences in spectra between two areas can be accounted for.

The heat exchanger 518 is used to control the temperature the platform 512. The temperature of the platform 512 also regulates, in part, the temperature of plants housed in plant growth devices 590. In some embodiments, a heat exchanger 518 is used for cooling the platform 512, e.g., to offset the heat generated by the LED panel 514. Further, using the heat exchanger 518 to cool the platform 512 would keep the root chamber of a plant growth device 590 cooler than the growth chamber, which would help to reduce or prevent condensation in the growth chamber. In some embodiments, the heat exchanger 518 is used to reproduce the temperatures in specific environmental conditions in which plants grow (e.g., increased temperatures or large hot/cold swings during day/night). In some embodiments, the heat exchanger 518 is used to keep the first surface of the platform 512 at a constant temperature. Keeping the first surface of the platform 512 at a constant temperature can be used to simulate an environment in which air temperatures are less stable than soil temperatures.

In some embodiments in which the platform 512 comprises two or more pieces of metal, a separate heat exchanger 518 may be used to control the temperature of each piece of metal. With such a setup, experiments could be performed with different pieces of the platform 512 being at different temperatures.

In some embodiments, the heat exchanger 518 uses a liquid to heat and cool the platform 512 (e.g., a closed loop circulation system in which a liquid can be heated or cooled). In some embodiments, the liquid is water or water with a polymer disposed therein (e.g., the polymer can make the water less electrically conductive). In some embodiments, the heat exchanger 518 includes electrical elements to heat or cool the platform 512. For example, in some embodiments, the heat exchanger 518 includes a resistive heater for heating and Peltier device for thermoelectric cooling.

In some embodiments, the growth apparatus includes temperature sensors (not shown). In some embodiments, a temperature sensor is a resistance temperature detector (RTD) or a thermocouple. In some embodiments, temperature sensors are used to measure the temperature of the first surface of the platform 512, the root chamber of a plant growth device 590, the growth chamber of a plant growth device 590, the interior of the light chamber 510 of the growth apparatus, and combinations thereof.

Figure 18:
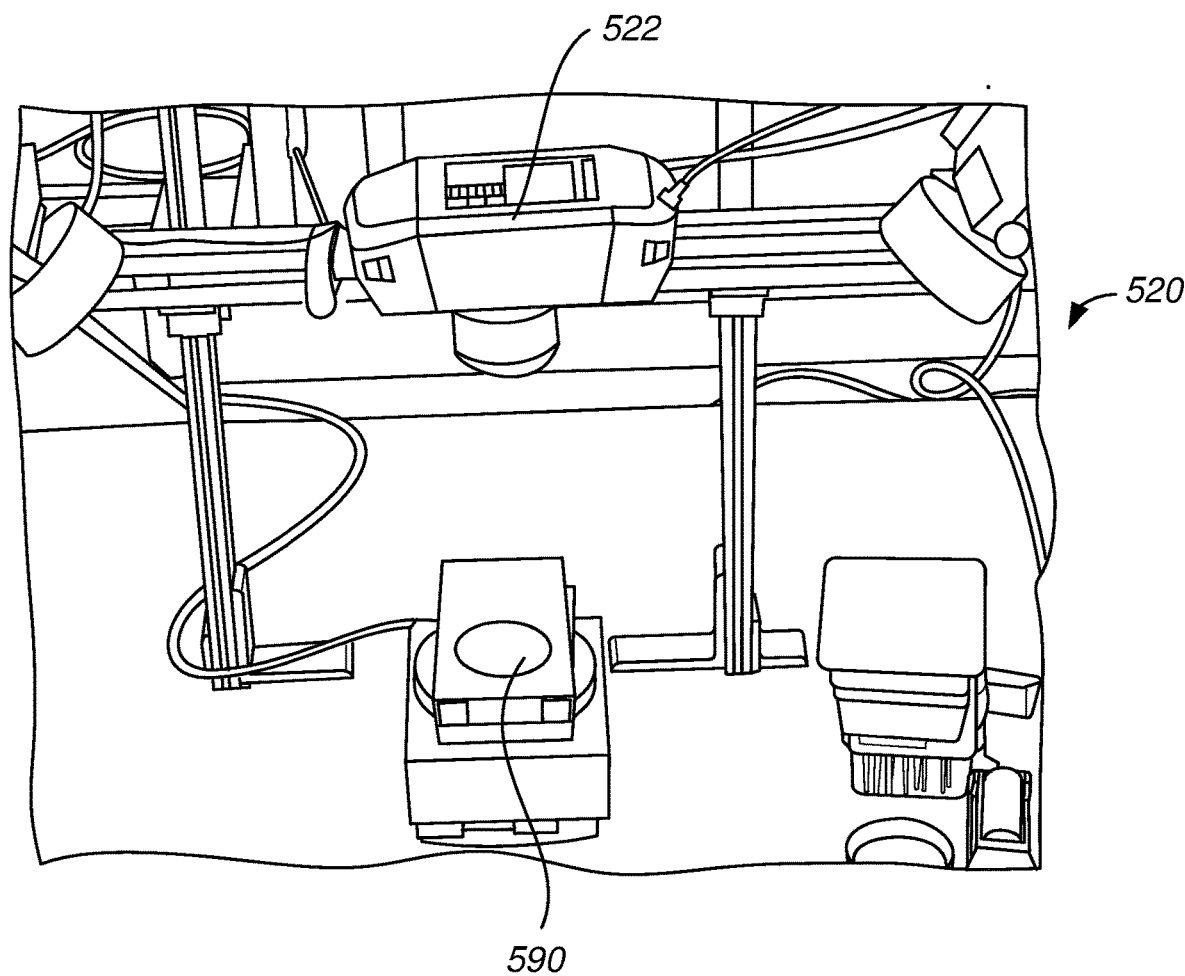
FIG. 18 shows an example of an illustration of an imaging module including a camera.

FIG. 18 shows an example of an illustration of an imaging module including a camera. In some embodiments, when the imaging device is a camera 522, the camera is a visible range hyperspectral camera. For example, a visible range hyperspectral camera may be able to collect image in 205 bands from vertical and horizontal positions, thus enabling image analysis of a plant grown in a plant growth device 590. In some embodiments, to enable image collection from vertical and horizontal positions, the camera 522 is mounted such that is can be rotated about an axis at least about 90°. In some embodiments, the imaging module 520 including a camera 522 further includes a rotatable platform on which the plant growth device 590 is placed. The plant growth device 590 can then be rotated while positioned on the rotatable platform to collect images from multiple horizontal vantage points.

In some embodiments, when the imaging device is a scanner (e.g., a flatbed scanner that may be used to scan a document), the scanner is positioned to image the roots of a plant growth device 590 placed on the scanner. Such a scanner can be used to quickly image the roots of a plant in a plant growth device 590.

When the imaging device is a microscope, the microscope can be used to image the roots of a plant in a plant growth device 590. Morphological changes and microbial localization in the roots may be measured. For example, the microscope may be inverted. That is, the objective lens of the microscope is pointed upwards so that a plant growth device 590 can be transported to the imaging module 520, placed on an area of the platform under which the microscope is positioned, and then the roots of a plant in the plant growth can be imaged with the microscope. In some embodiments, the microscope is operable to perform an x-y scan of the root chamber of the plant growth device 590.

In some embodiments, the microscope is operable to perform Fourier transform-infrared (FT-IR) imaging, short-wave infrared (SWIR) imaging, or Raman imaging. Such imaging techniques allow for, for example, chemical characterization (e.g., compositions, concentrations, and/or spatial distribution) of the roots of a plant, the analysis of soils, and identification of microbes and microbial colonization in the root chamber.

Figure 19:
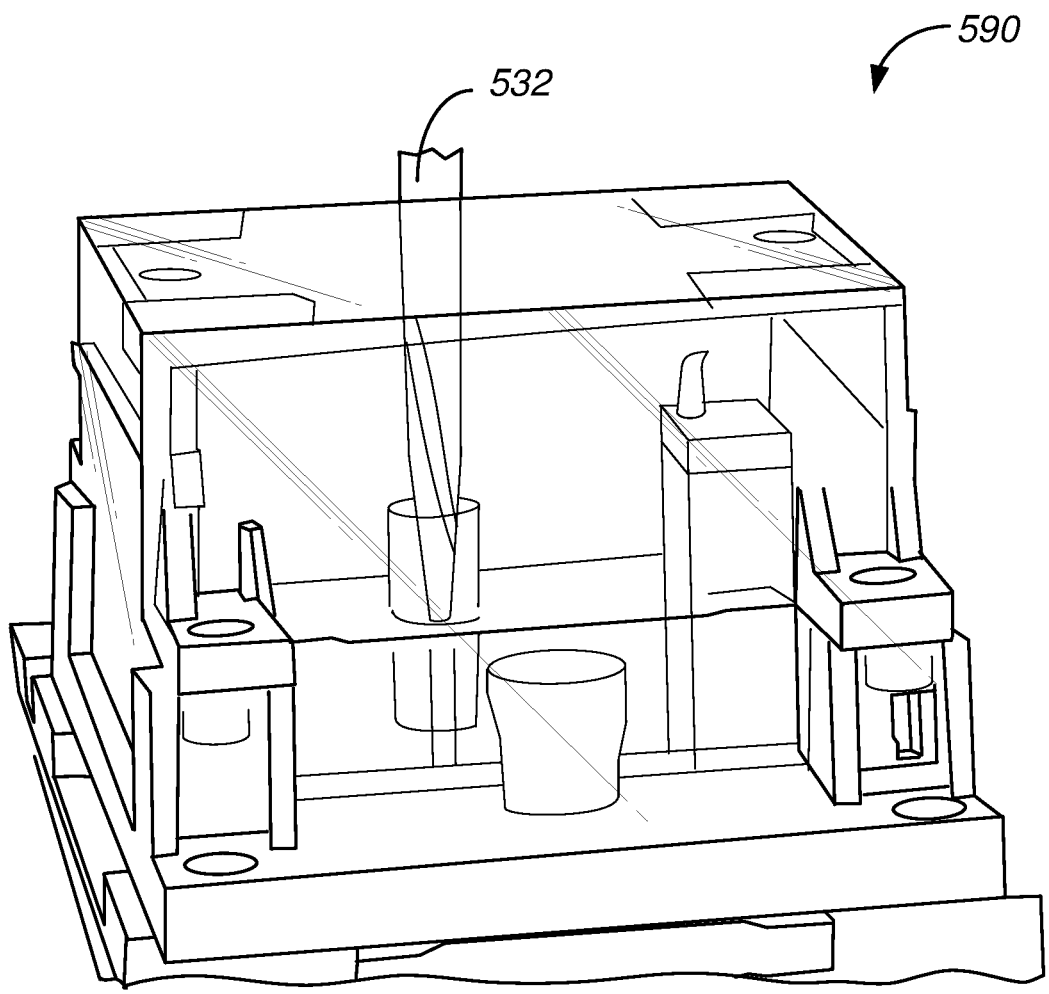
FIG. 19 shows an example of an illustration of a pipette of a liquid handling unit accessing a port of a plant growth device.

In some embodiments, the liquid handling unit 530 is operable to access the first port and the second port of the plant growth device 590. In some embodiments, the liquid handling unit 530 includes one or more pipettes 532 operable to add and remove liquids from the plant growth device 590. FIG. 19 shows an example of an illustration of a pipette of a liquid handling unit accessing a port of a plant growth device. The liquid handling unit can to sample the root chamber of the plant growth device 590 to collect samples for characterization. In some embodiments, the liquid handling unit 530 includes a cooling unit operable to cool such samples for subsequent characterization. The liquid handling unit can also add nutrients (e.g., fertilizers), chemicals (e.g., metabolites or antibiotics), or microorganisms (e.g., microbes) to the root chamber of a plant growth device 590 for experiments to determine the impact on a plant.

In some embodiments, the liquid handling unit 530 can sample and refill a plant growth device 590 aseptically (e.g., free from pathogenic microorganisms). In some embodiments, the liquid handling unit 530 has forced air (e.g., HEPA filtered) that can be delivered when a plant growth device 590 is opened so there is positive pressure in the system to reduce outside contamination.

In some embodiments, the growth apparatus includes a tilt module (not shown). In some embodiments, the tilt module is operable to tilt a base of the plant growth device 590 about 25° to 45° from the horizontal. When tilting a plant growth device 590 in such a manner, any fluid in the root chamber would collect at the first port or the second port. This allows for the liquid handling unit to more easily sample to root chamber or to remove most or all of the fluid from the root chamber, for example.

Figure 20:
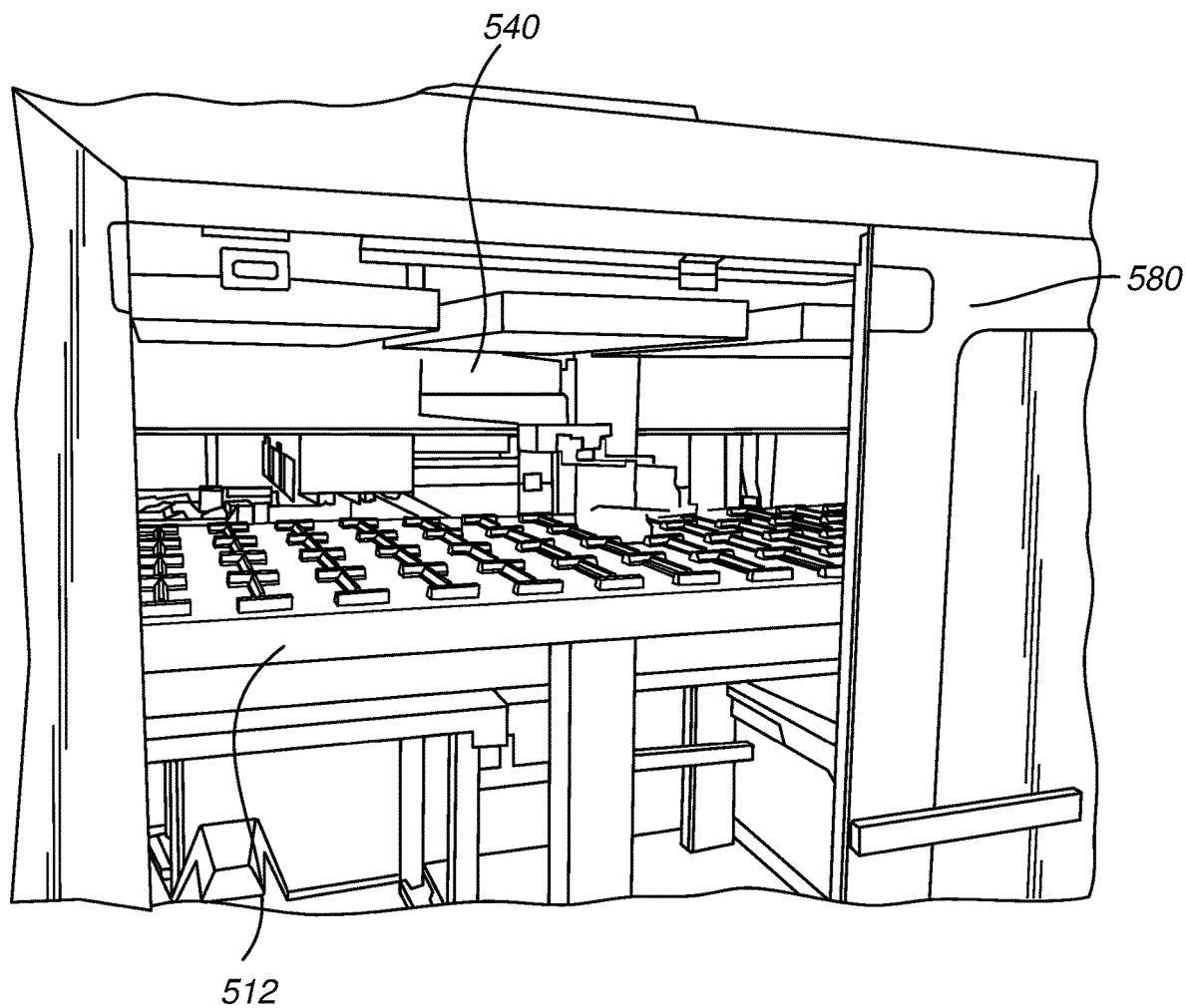
FIG. 20 shows an example of an illustration of a chamber, a platform, and a robotic arm of a growth apparatus.

FIG. 20 shows an example of an illustration of a chamber, a platform, and a robotic arm of a growth apparatus. The robotic arm 540 is operable to pick up and move a plant growth device 590 from the platform 512 to an imaging module 520 and back to the platform 512. The robotic art can also rotate a plant growth device 590 about its vertical axis. The robotic arm 540 can further move a plant growth device 590 to any component of the growth apparatus, for example, a loading deck for plant growth devices 590 into or out of the growth apparatus.

In some embodiments, the robotic arm 540 is operable to grip and hold a plant growth device 590 from the sides of the plant growth device 590. The gripping and holding may be aided by features on the sides of a plant growth device 590, as described above.

Further, in some embodiments, plant growth devices 590 include caps or lids that are placed on or over the first inlet and the second inlet of the plant growth device 590. Such a cap can prevent or help to prevent contamination of the plant growth device 590. In such instances, the robotic arm 540 is operable to remove and reinstall the caps or lids.

The above described components of a growth apparatus (i.e., the platform 512, the LED panel 514, the heat exchanger 518, the imaging module 520, the liquid handling unit 530, and the robotic arm 540) are positioned within a chamber 580. Being "positioned within a chamber" is meant to indicate that the elements of the components that needed to be in the chamber for the growth apparatus to function are within the chamber, but not all of the elements of the components are necessarily in the chamber. For example: the power supplies and control electronics for the LED panel, the imaging devices, the liquid handling unit, and the robotic arm may not be in the chamber; a fluid circulation system of the heat exchanger may not be in the chamber; and a fluid system for the liquid handling unit may not be in the chamber. With all of the components of the growth apparatus housed in a chamber, contamination of plants in the plant growth devices can be reduced or eliminated. In some embodiments, humidity, oxygen level, and/or carbon dioxide level are substantially maintained at specified values in the chamber. In some embodiments, the growth apparatus includes a humidity sensor, an oxygen sensor, and/or a carbon dioxide sensor to monitor these levels in the chamber.

The chamber 580 may be constructed using any type of suitable material. In some embodiments, walls and a top surface of the chamber 580 comprise a plastic, such as a polycarbonate or an acrylic, for example.

In some embodiments, the growth apparatus includes a fan (not shown) that is operable to circulate air within the chamber. In some embodiments, the growth apparatus includes a fan that is operable to draw in air from outside the growth apparatus. The air may pass through a HEPA filter before entering the chamber. Introducing air from outside the chamber may aid in cooling the chamber (i.e., via convection cooling).

In some embodiments, the growth apparatus includes an observation camera (not shown). Such an observation camera may be positioned so that it can image the plant growth devices 590, for example. An observation camera/or cameras may also be positioned to aid in manual movement (i.e., with controls outside of the chamber 580) of the robotic arm 540 or the liquid handling unit 530.

In some embodiments, a growth apparatus has dimensions of about 1 meter cubed ($m^3$) to 4 $m^3$, or about 1 $m^3$ to 2 $m^3$.

In some embodiments, the growth apparatus includes a control system (not shown) operable to control different operations in the growth apparatus. For example, a control system can control the LED panel so that it provides a specific day/night cycle, a specific light intensity, and/or specific wavelengths. A control system can also control the temperature of the platform (e.g., via the heat exchanger) to simulate the temperature during the day/night.

In some embodiments, a control system controls plant growth device imaging, cultivation, liquid handling, etc. In some embodiments, a control system includes a liquid handling controller unit and a robotic arm controller. In some embodiments, a control system includes a liquid handling unit controller, a robotic arm controller, a LED panel controller, a heat exchanger controller, and an imaging device controller. In some embodiments, the apparatus can be used to perform autonomous experiments in which software is used to automatically design subsequent experiments.

In some embodiments, once plant growth devices are placed in the growth apparatus, the growth apparatus is a closed system. An experiment can be designed and carried out without accessing the chamber of the growth apparatus.

In some embodiments, a growth apparatus can implement a process for discovering or optimizing plant growth conditions, which may include different microbes and media conditions. The effects of different plant growth conditions can be assessed using imaging, which can be used as input for robotic arm controller based on the performance of previous experiments.

In some embodiments, a growth apparatus can be used to optimize plant nutrition. In some embodiments, a growth apparatus can be used to optimize microbial composition. In some embodiments, a growth apparatus can be used to increase soil carbon. In some embodiments, a growth apparatus can be used for plant or algal optimization, including discovering, characterizing, and optimizing beneficial treatments to plants or algae. In some embodiments, a growth apparatus can be used to optimize one or more aspects of plant or algal genotype, including for the environment (e.g., variations in temperature and light over time), inorganic conditions, organic conditions, microbial compositions, and combinations thereof.

Other potential uses of a growth apparatus include:
development of biological and chemical fertilizer formulations for plants under different conditions (e.g., different soil conditions);
screening of plant amendments for effectiveness under various conditions;
screening of plant amendments for potential biohazards;
identifying how different plant amendments affect plant root and leaf traits at various stages of growth;
examining treatments that promote soil health; and
examining the response of plants, microbes, and soils to stresses including environmental stress, nutrient stress, water stress, etc.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. An apparatus comprising:
a platform, a first surface of the platform including features defining a plurality of areas, each area defining a space for a plant growth device;
a light emitting diode (LED) panel, the LED panel positioned to illuminate the first surface of the platform;
a heat exchanger, the heat exchanger being in thermal contact with a second surface of the platform;
one or more imaging modules, an imaging module including an imaging device from the group a microscope, a camera, and a scanner;
a liquid handling unit operable to add and remove liquids from the plant growth device; and
a robotic arm, the robotic arm operable to pick up and move the plant growth device from the platform to an imaging module; and
a chamber, with the platform, the LED panel, the heat exchanger, the one or more imaging modules, the liquid handling unit, and the robotic arm being positioned within the chamber, the chamber being a chamber with a controlled environment.

2. The apparatus of claim 1, wherein the platform comprises a metal.

3. The apparatus of claim 1, wherein the platform defines about 16 to 50 areas.

4. The apparatus of claim 1, wherein an area of the plurality of areas is about 85 millimeters by 127 millimeters.

5. The apparatus of claim 1, wherein areas of the plurality of areas on the platform are defined in a shape of a square or a rectangle.

6. The apparatus of claim 1, wherein the heat exchanger uses a liquid to heat and cool the platform.

7. The apparatus of claim 1, wherein a surface defined by light emitting diodes of the LED panel is substantially parallel to the platform.

8. The apparatus of claim 1, wherein the LED panel includes a first LED that emits light at 385 nanometers, a second LED that emits light at 450 nanometers, a third LED that emits light at 521 nanometers, a fourth LED that emits light at 660 nanometers, a fifth LED that emits light at 730 nanometers, and a sixth LED that emits light at 2700 K.

9. The apparatus of claim 1, wherein an intensity of light emitted by the LED panel is about 80 $\mu mol \cdot m^{-2} s^{-1}$ to 600 $\mu mol \cdot m^{-2} \cdot s^{-1}$.

10. The apparatus of claim 1, wherein the microscope is operable to perform Fourier transform-infrared (FT-IR) imaging, short-wave infrared (SWIR) imaging, or Raman imaging.

11. The apparatus of claim 1, wherein the camera is a visible range hyperspectral camera.

12. The apparatus of claim 1, wherein the imaging module including a camera further includes a rotatable platform on which the plant growth device is placed.

13. The apparatus of claim 1, wherein the liquid handling unit includes one or more pipettes operable to add and remove liquids from the plant growth device.

14. The apparatus of claim 1, further comprising:

a tilt module, wherein the tilt module is operable to tilt a base the plant growth device about 25° to 45° from the horizontal.

15. The apparatus of claim 1, further comprising:
a fan operable to circulate air within the chamber.

16. The apparatus of claim 1, further comprising:
a humidity sensor operable to monitor humidity in the chamber;
an oxygen sensor operable to monitor oxygen level in the chamber; and
a carbon dioxide sensor operable to monitor carbon dioxide level in the chamber.

17. The apparatus of claim 16, wherein when the apparatus is in use, the humidity, the oxygen level, and the carbon dioxide level are substantially maintained at specified values in the chamber.

* * * * *